Patented Oct. 11, 1927.

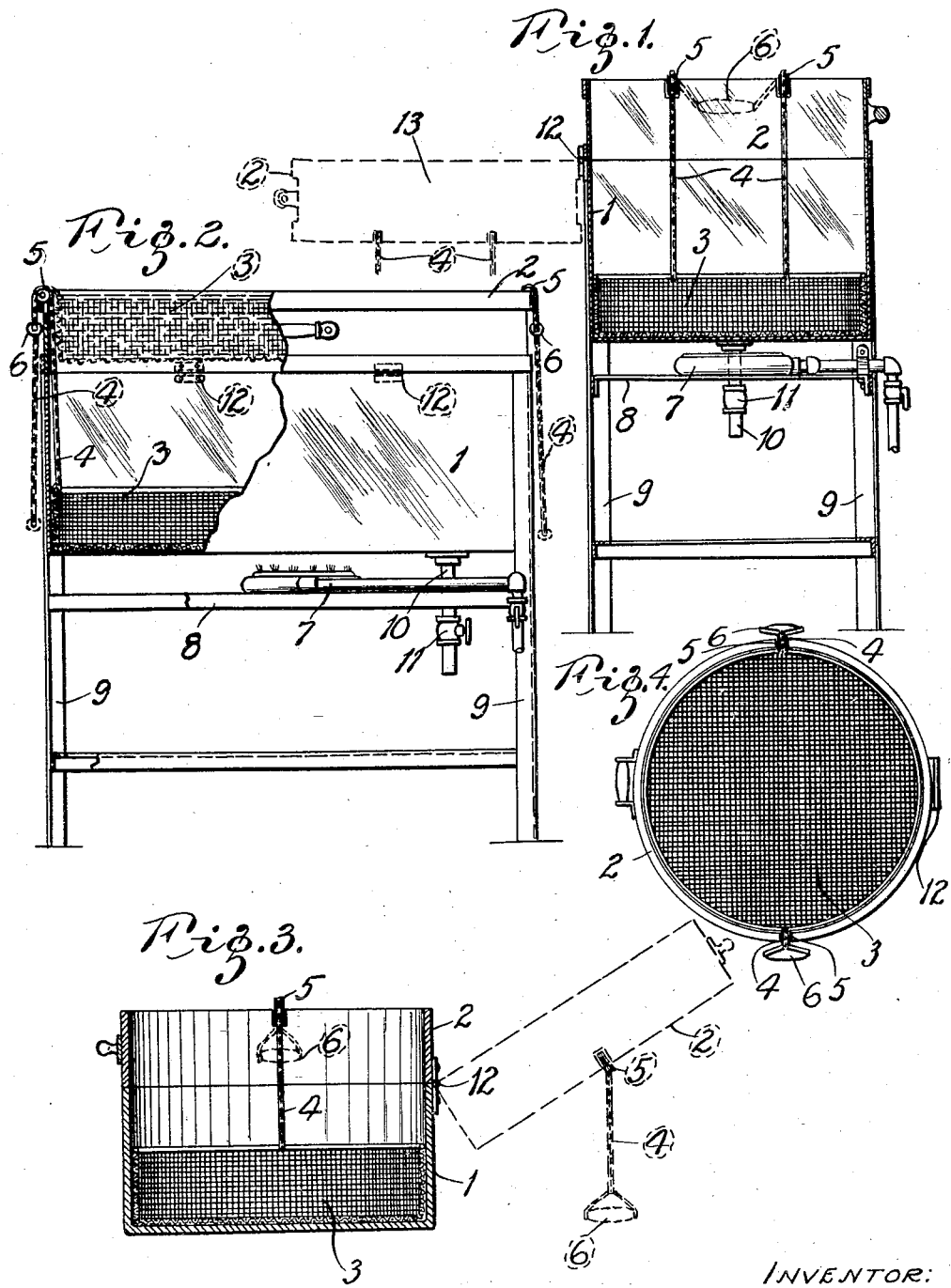

1,644,977

UNITED STATES PATENT OFFICE.

ANNA D. BRUNE, OF ST. LOUIS, MISSOURI.

DRAINING AND DUMPING CONTAINER.

Application filed January 8, 1927. Serial No. 159,878.

My invention relates to draining and dumping containers and more specifically to wash boilers, cooking utensils, etc.

The object of my invention is to provide a container in which solid matter may be readily drained of liquid and discharged with a single operation.

The operation, uses and description of my device is herein contained.

In the drawings,

Fig. 1 is an end elevation partly in section.

Fig. 2 is a side elevation partly in section.

Fig. 3 is a vertical elevation, partly in section, of a modified form of my device.

Fig. 4 is a plan view of a modified form.

My improved draining and dumping container may be used in any case where solid matter is immersed in liquid, such as washing machines, wash boilers, or cooking utensils, or any other container where it is desirable to separate the liquid from the solid matter.

My device consists of an enclosing outer shell 1, provided with a hinged upper portion 2. A wire basket 3 of like contour is adapted to fit into the shell 1 and rests upon the bottom of said shell.

At opposite ends of the basket 3, flexible members 4 are provided having their lower ends joined to the basket 3, passing upward over rollers 5. The outer ends of said flexible members terminate with a suitable handle 6.

When used as a wash boiler, a suitable gas burner 7 is provided, supported on braces 8 attached to the legs 9. A liquid outlet 10 permits draining off of the liquid by means of the valve 11.

When it is desired to remove clothes from the boiler, the flexible members are drawn upwardly and outwardly causing the wire basket 3 to raise wholly within the hinged upper portion 2 which is then rotated about its hinges 12, and the entire batch of clothes is dumped when the upper portion 2 reaches a horizontal position, as shown by the dotted lines 13.

The same operation takes place when cooking vegetables in the modified form shown in Figs. 3 and 4.

Having fully described my invention and its mode of operation, what I claim as new and useful, and desire to protect by Letters Patent is:—

A draining and dumping container of the class described, comprising a hollow shell having a hinged upper portion, a wire basket disposed within said hollow shell adapted to be raised and lowered by means of an upward and outward movement of flexible members whose lower ends are attached to opposite sides of said wire basket, then pass upward over rollers provided in said hinged upper portion and terminating in handles on the outside of said hollow shell, said wire basket being adapted to fit said hinged upper portion and said hollow shell, and said hinged upper portion being adapted to be rotated to a horizontal position whereby solid matter drained of liquid and contained in said wire basket may be dumped.

In witness whereof I have hereunto affixed my signature this 30th day of November, 1926.

ANNA D. BRUNE.